United States Patent [19]

Parker, III et al.

[11] Patent Number: 4,892,667

[45] Date of Patent: Jan. 9, 1990

[54] METHOD AND MEANS FOR DEWATERING LUBRICATING OILS

[75] Inventors: Matt Parker, III; Michael D. Blom; Roger K. Miller, all of LaGrange, Ga.

[73] Assignee: Kaydon Corporation, Muskegon, Mich.

[21] Appl. No.: 245,045

[22] Filed: Sep. 16, 1988

[51] Int. Cl.$^4$ .................. B01D 17/02; B01D 29/26
[52] U.S. Cl. .................. 210/799; 210/241; 210/DIG. 5; 210/806; 210/338; 210/315
[58] Field of Search .............. 210/799, 806, 505, 507, 210/508, 315, 335, 338, 241, 148, DIG. 5

[56] References Cited

U.S. PATENT DOCUMENTS

| | | | |
|---|---|---|---|
| 2,701,062 | 2/1955 | Robinson | 210/148 |
| 3,199,676 | 8/1965 | May | 210/315 |
| 4,102,785 | 7/1978 | Head et al. | 210/507 |
| 4,240,908 | 12/1980 | Swain | 210/799 |

Primary Examiner—Richard V. Fisher
Assistant Examiner—Cynthia L. Nessler

[57] ABSTRACT

A process for removing by coalescence condensation water from large quantities of lubricating oil of a steam driven turbine a significant portion of which water is in the form of an oil/water emulsion. The process is capable of reducing the free and emulsified water content of lubricating oil having a viscosity rating of 150 ssu at 100° F. from 5000 ppm to 25 ppm in a single pass through the unit at a flow rate of 100 gallons per minute with most of the water in the oil as received by the equipment being in emulsion.

12 Claims, 6 Drawing Sheets

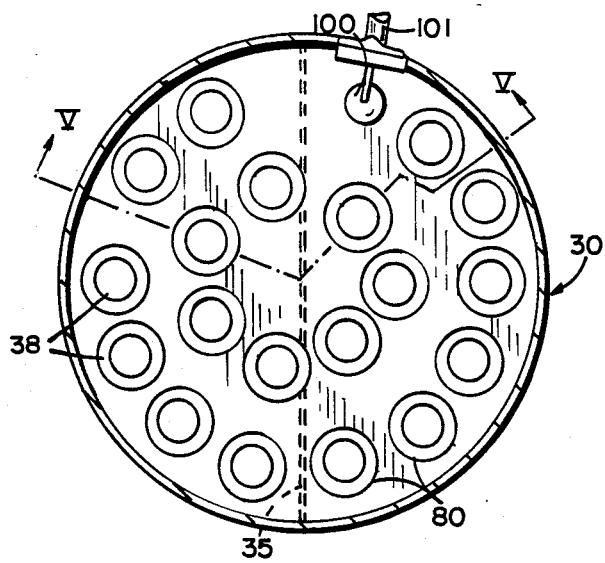
FIG. 3
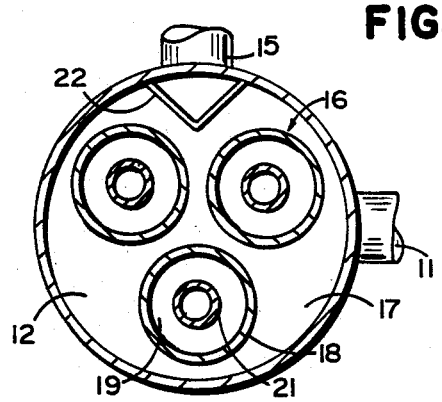
FIG. 4
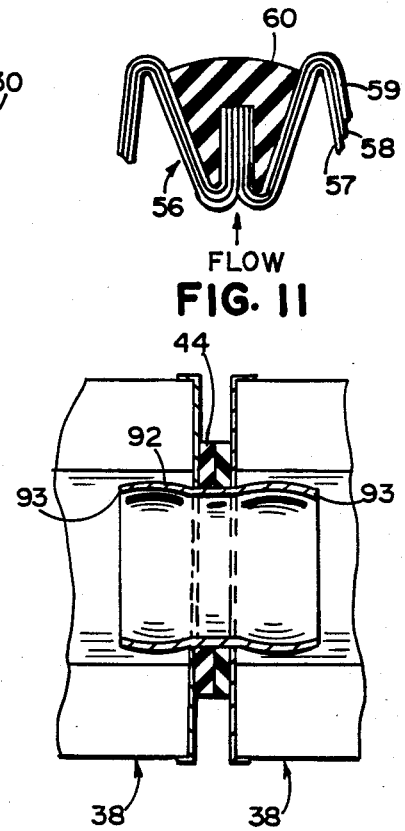
FIG. 11
FIG. 6
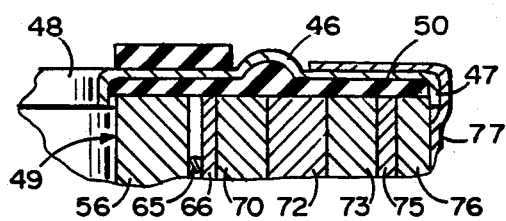
FIG. 10
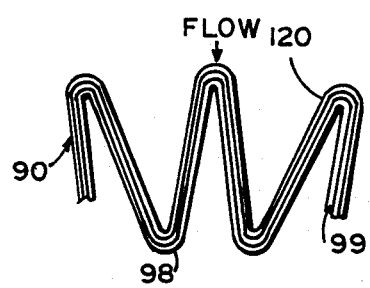
FIG. 9

METHOD AND MEANS FOR DEWATERING LUBRICATING OILS

FIELD OF THE INVENTION

This invention relates to the removal by coalescence of steam condensate from the lubricating oil of large steam turbine driven generators.

BACKGROUND OF THE INVENTION

It is essential that the steam turbines of large generating stations be effectively lubricated. During the operation of the turbines a certain amount of the steam used to drive the turbines condenses either before or after it makes contact with the lubricating oil for the turbine. When new turbines are first put into operation, the volume of condensate becoming mixed with the lubricating oil normally is relatively small in most equipment. However, as the turbines age, wear gradually decreases the effectiveness of the seals separating the steam from the lubricating oil. This wear, however, is not enough to adversely affect the operating efficiency of the turbine. So long as the efficiency is not affected, the cost of replacing the worn seals is not justified. Further, tolerance variation within practical and acceptable limits can and does significantly affect the rate of steam leakage into the lubricating oil, even in new equipment. Further, even new equipment having the most effective seals will allow an unacceptable quantity of condensate to accumulate in the lubricating oil after a period of use.

The accumulation of this condensate creates a difficult and expensive problem. In the past, one method was simply to replace the oil. Since the volume of oil involved runs into thousands of gallons, this has become very expensive. Further, disposing of such oil has also become very expensive. Some processes have been developed for separating the condensate from the oil. These processes, however, have been slow and cumbersome and not adaptable to use at a generating plant. As a consequence, one of the more common procedures in use today is to replace the used oil with fresh, condensate free oil. The used oil is placed in tanks and shipped to a remote, central processing facility where it is purged of both the condensate and any accumulated particulate matter so it can be reused. Once again, while this procedure is less expensive than simply replacing the oil and disposing of it, it is expensive, labor intensive and cumbersome.

In an attempt to provide on site processing of the lubricating oil, centrifuges and vacuum dehydrators have been used. However, these units have inadequate capacity and further, at best, have been shown to be marginally capable of doing an efficient job. This invention, for the first time, makes it possible to process the lubricating oil at the generating station and return it to the system as a continuous closed circuit procedure incorporated into the lubrication system at a rate well in excess of the rate of ingression of the water contaminant.

The lubricating oil leaving the turbines contains three forms of water, which are free water, water in an oil emulsion and dissolved water. The dissolved water is not a problem to the turbine equipment and this invention does not deal with it. The invention removes all of the free water by gravity separation. The invention is directed to the removal of the water from the oil/water emulsion. This has never been done before at a rate and in a manner which is compatible with the oil usage rate of a major turbine generating facility. While the removal of water from an oil/water emulsion has long been known, the rate at which the process could be carried out was so slow that it has been of no practical value in dealing with the problems of a steam turbine generating station. For example, the known processes could not process the oil requirements of a large steam turbine unless the facility was so large as to be wholly impractical and, even then, would be incapable of the degree of dewatering achieved by this invention. Another parameter of the problem is temperature. Even though such units would work when the oil temperature was 120° F. and the viscosity low, it was found that the coalescence process ceased when viscosity exceeded 100 ssu. Thus, prior art units using coalescence not only had unacceptably low flow capacity, they were completely inoperative at some normal operating temperatures and viscosities. It had long been recognized that whatever water separation system was to be used it should be capable of processing oil having a viscosity in excess of 200 ssu.

SUMMARY OF THE INVENTION

An integrated lubricating oil processing unit is provided in which the oil is first filtered to remove some of the free water and also entrained particulate matter, then passed through a coalescing unit for final and complete free and emulsified water removal and finally a polishing filter for complete removal of entrained particulate matter and returned to the lubricating oil reservoir. The unit provides continuous processing of the lubricating oil as the oil is used, that is, as it is pumped under pressure through the turbine bearings and is returned to the reservoir. In the first filter, particulate matter is removed. Also, a significant portion of the free water is separated from the oil. In other words, this serves as a preconditioning unit. The oil from this unit is then passed to the coalescing unit where the remaining free water and the water/oil emulsion is broken by passing the oil containing the emulsion through a series of materials with the first material providing very minute interstices to initiate coalescence and then passing the oil containing the water freed by coalescence outwardly through a series of different materials until the freed water progressively forms into droplets large enough to be separated by gravity or by the separator filter element from the stream of oil. At the same time, the material which causes coalescence to occur is capable of handling oil having a viscosity of up to approximately 350 ssu, although the through-put rate is materially reduced.

Not only is the invention capable of processing oil in volumes never before considered possible but it is also capable of removing a much higher percentage of the water from the oil. It has proven capable of processing lubricating oil containing 5000 ppm or one-half of one percent water concentration, of which water, three parts are emulsified and one part is free water and has a viscosity up to 100 ssu at a rate of one hundred gallons per minute reducing the concentration of water in emulsion to less than 25 ppm in a single pass through the system.

BRIEF DESCRIPTION OF THE DRAWINGS

FIG. 3 is an enlarged sectional view taken along the plane III—III of FIG. 1;

FIG. 4 is a sectional elevation view taken along the plane IV—IV of FIG. 1;

FIG. 6 is an enlarged central sectional view of a modified construction for joining a pair of coalescer elements;

FIG. 9 is a enlarged fragmentary sectional view of a typical filter used in the a coalescer element;

FIG. 10 is a fragmentary enlarged view of a typical end structure of a coalescer element;

FIG. 11 is a fragmentary sectional view of the joint of the pleated stock forming the filter for a coalescer;

DESCRIPTION OF THE PREFERRED EMBODIMENT

Figure 1:
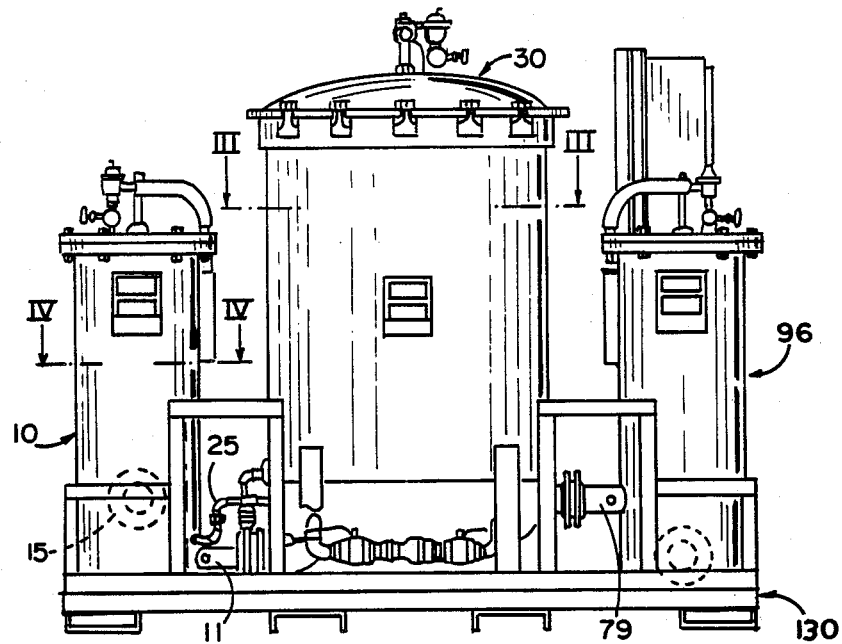
FIG. 1 is a front elevation view of the unit illustrated in FIG. 2.
Figure 2:
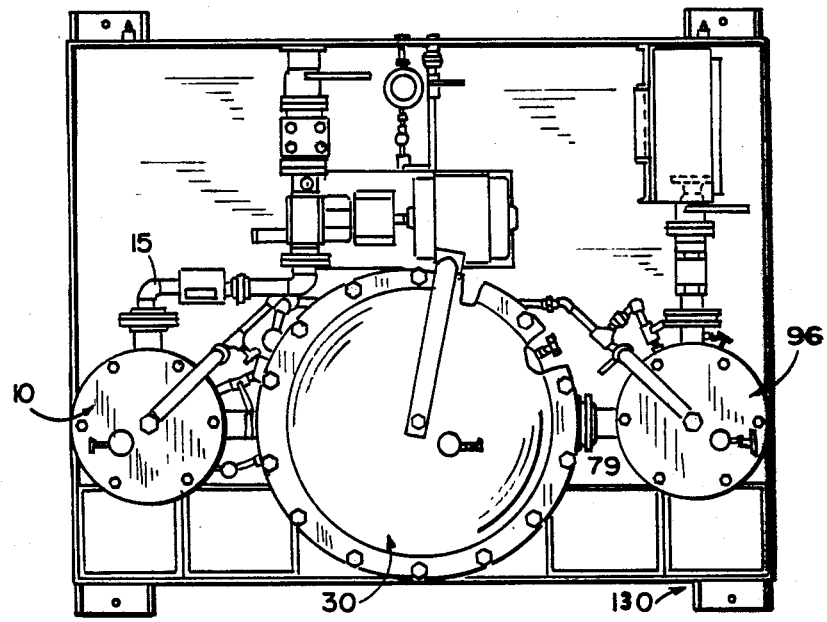
FIG. 2 is a plan view of a steam turbine lubricating oil dewatering unit incorporating the invention.

Referring to FIGS. 1 and 2, the numeral 10 identifies a first filter or preconditioning element through which the oil from the turbines enters the water removal system. In this unit, the oil is passed through a filter to remove particulate matter. This filter is designed to remove all of the particulate matter of 15 microns or larger. Some very minute matter may be passed through the system to be removed by the final polishing filter. In the preconditioning unit 10, some of the free water is separated from the oil before the oil passes through the filter.

The oil, after passing through the filter 10 is transferred to the coalescing unit 30 through the pipe 11. The oil, after processing in the coalescing unit 30 and substantially purged of its oil/water emulsion content, is passed to the final or polishing unit 96 via the pipe 79.

The preconditioning unit 10 (FIG. 1) includes a closed vessel divided into an upper chamber and a lower chamber separated by a partition providing a seal between the chambers. The filter elements are located in the upper chamber 12 (FIG. 4). The oil enters the upper chamber 12 through the port 15 and passes through the filters 16 to the lower chamber beneath the partition 17 (FIG. 4). The filtered oil discharges from the lower chamber through the pipe 11 (FIGS. 1 and 4).

Figure 8:
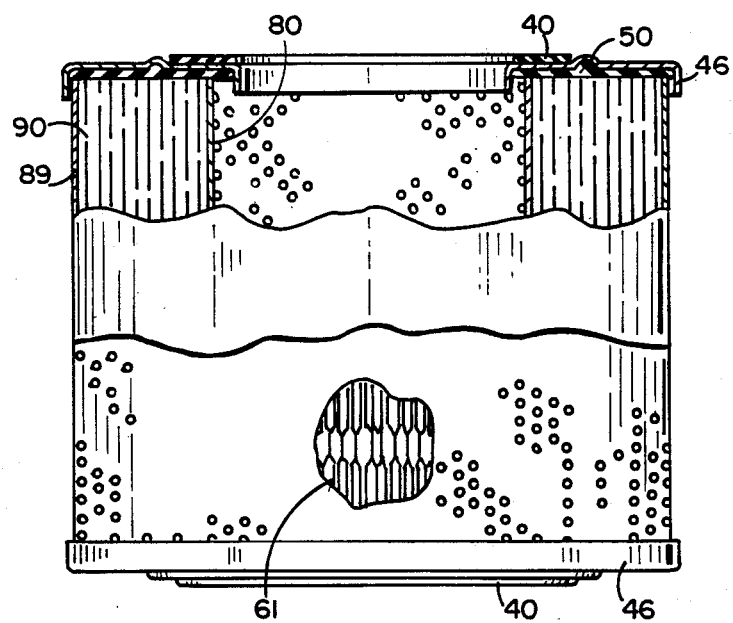
FIG. 8 is a fragmentary central sectional view of one of the filter elements of the preconditioning unit.

Plural filter elements 16 are utilized. Each filter element includes a jacket 18 which encloses a pleated paper filter medium 19 (FIG. 4). At intervals of approximately 2¼ inch spacings, dimples, such as the dimples 61 illustrated in FIG. 8, are formed in the pleats of the outer layer where the walls of adjacent pleats are displaced circumferentially to abut each other and form reinforcements supporting the pleats against folding against each other due to internal pressure. The use of the dimples is important when the oil contains excessive quantities of water which causes increased pressure and also may weaken the filter material despite treatment of the material such as with phenolic resin. This is particularly true at start-up when both the viscosity of the oil and its water content may be high. Inside the filter medium 16 is a perforated metal tube 21. The oil flows through the elements and drains into the tube 21 and flows down into the lower chamber from which it is discharged through pipe 11 to the coalescing unit 30 (FIG. 1). Continuous free water discharge means is provided by differential pressure through pipe 25 (FIG. 1). The baffle 22 at the inlet port prevents the incoming oil from impacting against the filters, disturbing their function.

The pleated paper material 19 is a paper base material with corrugation depth of about 0.018 inch and having a Frazier Air Flow rating of about 14 cubic feet per minute per square foot at a pressure differential equal to one-half inch of water. The paper material 19 must be stable in the presence of lubricating oil under the operating pressures and temperatures which vary through a wide range.

The coalescer unit 30 (FIG. 5) is also a closed vessel having a horizontal partition 31 near the bottom of the unit creating an upper or coalescence chamber 32 and a lower chamber divided into an inlet compartment 33 and an outlet compartment 34 separated by a vertical partition 35 forming a seal between the compartments. The turbine oil, after passing through the preconditioning unit 10 enters the coalescer unit through the inlet pipe 11 and compartment 33.

The oil in the inlet compartment 33 is discharged through the stand pipes 36 into the several coalescer columns 38. It will be observed from FIG. 3 that the unit has ten coalescer columns 38, each one of which communicates in the same manner with the inlet compartment 33. These columns are identical. Therefore, the following description of one column is to be considered a description of all of the columns.

The stand pipe 36 is surrounded by a flange 39 which provides a seat for the coalescer column 38. The flange 39 is spaced from the upper end of the stand pipe, providing a stub portion over which a coalescer element seats to position and stabilize it. A gasket 40 is provided between the end of the column 38 and the flange 39. Sealing the joint between the coalescer element and the flange is very important to prevent leakage of the incoming oil into the body of oil surrounding the coalescer columns, as will be explained subsequently. The mouth of the collar has a cross bar 41 providing at the center a threaded boss to secure the coalescer element anchor bolt 42.

Each coalescer column 38 is illustrated as consisting of a pair of stacked mechanically connected coalescer elements 43. It will be recognized that should it be necessary to provide a unit with greater flow through capacity, a vessel might be provided which would permit a longer column such as three or more of the elements 43 even though it would probably be more satisfactory to enlarge the diameter of the housing and add more coalescer columns. It will also be recognized that it is possible to construct each column using one single unit element of twice the length.

Where the two elements 43 are joined, a connector collar 46 is provided which has a radial flange midway between its ends. The connector collar aligns and stabilizes the elements of the column with the flange providing a seat for the gaskets 40. The top of the column is closed and sealed by a cap 44 which has a collar section telescoped into the element and a plate of a diameter to seat on the gasket 40. The cap is secured by a nut threaded on the end of the anchor bolt 42.

Each end of each coalescer element is equipped with an annular end cap 46 the periphery of which is flanged at 47 to seat over the end of the element (FIG. 10). The end caps have a central opening 48 surrounded by an inturned flange 49. The end plates are secured or bonded to the ends of the inner and outer shells and to the material between these shells by a layer of adhesive 50 which is stable in the presence of lubricating oil and water in a temperature range at least as high as 300° F. This will be explained in greater detail subsequently. It is very important that the adhesive bond with an oil tight seal with every layer of the coalescer element, to be described subsequently. It has been discovered that any, even a very minor failure of the bond, will result in cessation of the coalescence phenomena. The adhesive must form a barrier preventing the oil from by-passing any of the layers of which the coalescing element is constructed.

Figure 7:
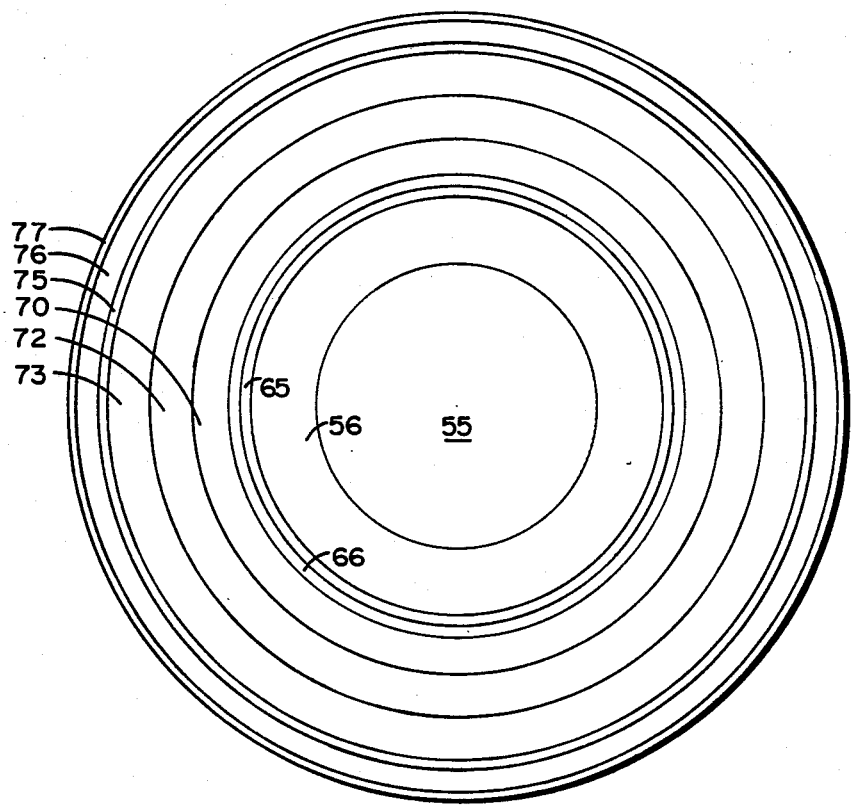
FIG. 7 is an enlarged sectional view of a coalescer taken along the plane VII—VII of FIG. 5 from which cross-sectioning has been omitted for purposes of clarity.

The coalescers are all identical, each being cylindrical (FIG. 7) and having a central chamber 55 into which the oil containing the water/oil emulsion is introduced (FIGS. 7 and 10). This chamber is surrounded by a pleated paper filter assembly 56. The filter assembly consists of three layers of filter material which are seated in surface contact with each other (FIG. 11). The inner layer 57 is a fiberglass/cellulose fiber material.

The intermediate layer 58 is an all fiberglass fiber medium of 15 mil mean thickness having a Frazier Air Flow of approximately 4 cu. ft/min. per sq. ft. at a pressure differential equal to one-half inch of water.

The external layer 59 is a paper having a Frazier Air Flow of approximately 65 cu. ft/min. per sq. ft. at a pressure differential equal to one-half inch of water. This paper is entirely of cellulose fiber. The paper is treated with a phenolic resin and silicone. Again, the material used for all three layers must be stable in the presence of lubricating oil at the operating temperatures and pressures of the coalescers and the water content of the lubricant.

The seam where the ends of the paper layers forming the filter abut is sealed by a bond 60 formed of an adhesive which is stable and retains its strength to at least 300° F. and is unaffected by both natural and synthetic lubricants and water (FIG. 11). This bond must have sufficient strength to positively seal the seam where the ends of the filter are joined even under radially outwardly acting pressures in excess of 60 lbs./sq. in. or more because failure of the seam will terminate the coalescence phenomena.

The apices or crowns of the external layer 59 of the filter assembly 56 are interconnected by a plurality of axially spaced bonds or rings 65 each approximately 0.2 of an inch wide of a polyamide resin (FIGS. 7 and 10). These rings are tension members. In FIG. 10, various ones of the components which make up a coalescer are not drawn to scale to make the illustration easier to read. The rings are axially spaced approximately 3 inches apart. The rings serve as stabilizers preventing the individual pleats deforming and folding against each other during processing of oil having an unusually high water content. The rings seat against the inside face of the tube 66. The tube is a perforated electrogalvanized steel member. This tube has to be a structural member capable of withstanding high internal differential pressures of a minimum of 75 psi preferably 100 psi. At the same time, it must be capable of permitting the oil and emulsified water having a viscosity of 100 ssu to pass through it at a flow rate of 10 gallons per minute per coalescer. To withstand this type of internal pressure, it is necessary that a weld seam be used to join the ends of the tube 66 after it has been formed to cylindrical shape. The tube seats closely around the rings 65 and provides the necessary strength to withstand the radially acting pressure exerted by the oil, especially when it is cold or even when hot, such as at 100° F. or more when it has a high water content since the resistance to movement through the coalescers increases sharply with increasing water content.

The initial breaking of the water/oil emulsion fraction of the oil passing through each coalescer is initiated before the oil reaches the tube 66, but a significant proportion of the water remains in emulsion at this point and that which has separated is in droplets so fine that it cannot be effectively separated from the oil. To coalesce the water already separated and to break the remaining emulsion, plural layers of fiberglass are wrapped around the exterior of the tube 66.

The inner one of these layers 70 is a mat of fiberglass having an initial or uncompressed thickness of one-half inch with a surface density of 0.021 lbs./ft. sq. and a binder content of 15% by weight. The intermediate layer 72 and the outer layer 73 are each a mat of fiberglass having an initial or uncompressed thickness of one-half inch with a surface density of 0.025 lbs./sq. ft. and a binder content of 17.5% by weight. The glass filaments are very fine, having a nominal diameter of 0.0004 of an inch.

The three layers 70, 72 and 73 of fiberglass are externally wrapped by a screen 75 coated with polyvinyl chloride which is applied under sufficient tension to compress the fiberglass to one-tenth of its original thickness. This results in a coalescence zone of numerous closely packed extremely small interstices, approximately 3 microns in the inner most layer, a condition conducive to breaking of the remaining portions of the emulsion. The interstices in the outer layer of the fiberglass might be as big as 10 microns. The minute size of the interstices formed by the compressed fibers causes the increasing size of the interstices radially outwardly through the fiberglass to encourage the growth in size of the water droplets as the individual droplets into contact each other and thus combine or coalesce. Even though the compressed layers of fiberglass have a total thickness of only 0.150 of an inch, the resulting lattice work of openings is effective in substantially total breaking of the emulsion fraction of the oil. The water drops thus formed, even though very minute, will remain as individual bodies rather than films on the matrix they are passing through. Further, the fineness of the glass fibers is a further factor inducing droplet formation and aggregation (coalescence zone saturation) by coalescence of water because the surfaces they contact are non-wetting. Due to the volume of oil being forced through the coalescers, the water droplets created by the coalescence will be carried out of the fiberglass through the openings in the screen 75 into the surrounding mat 76 of uncompressed glass fibers. This mat is about 0.27 inch thick and has a surface density of about 9.5 gr./sq. ft. and a resin content of about 10% by weight. In the mat 76, the water droplets further coalesce and are transported to the inner surface of the outer cover 77. The outer cover is a stretchable tube of knit cotton fiber which has been rendered non-wettable by application of a suitable silicone coating. The outer cover completes the coalescence process to the point of creating water droplets of a size and weight to descend through the oil rather than being simply transported by it. As a result, the water collects at the bottom of the chamber 32 where it forms a body separate from the oil and is discharged through the port 100 due to operation of the float valve 101 (FIG. 5).

Figure 5:
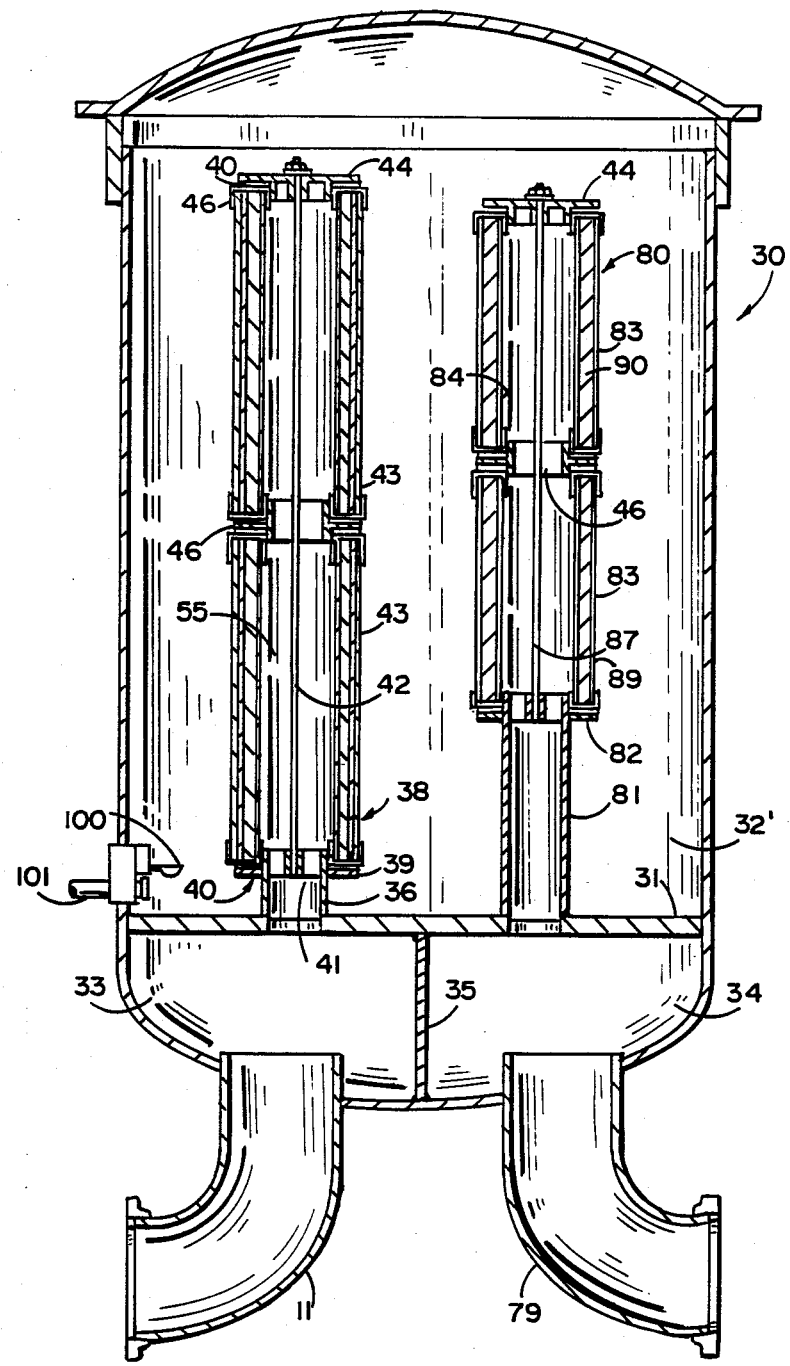
FIG. 5 is an enlarged sectional elevation view taken along the plane V—V of FIG. 3.

Also located in the coalescence chamber 32 are nine separator element columns 80 (FIG. 5). The elements of each of the columns are mounted on the upper end of a stand pipe 81 which extends through the partition 31 into the outlet compartment 34. The discharge stand pipes 81 are similar to the coalescer stand pipes 36 except they are longer and support the bottoms of the separator elements 80 substantially above the partition 31 and the lower ends of the coalescer columns to keep the separator elements above the water collection zone at the lower end of the chamber 32. Like the coalescer stand pipes 36, each discharge pipe 81 has a radial flange 82 adjacent its upper end to provide a seat and support for the separator elements 80 above. The oil discharges from the compartment 34 through the pipe 79 to the separator unit 96.

The separator columns, each consist of identical separator elements 83 having gaskets 40 at both ends and joined by a connector collar 46 in the same manner as the coalescer stand pipes illustrated in FIG. 5. The tops of the separator columns are also closed by caps 44 secured by the anchor bolts 87 which are fastened to the discharge stand pipes 81 in the same manner as the corresponding bolts used for the coalescers. The separator elements are all identical. Therefore, the description of one column will suffice for all of them. Because the elements of the separator columns have greater flow capacity than the elements of the coalescer columns, nine columns provide adequate capacity to handle the output of the ten coalescers.

Each separator element 83 has a pair of radially spaced cylindrical members, one forming a central tube 84 and the other the outer jacket 89. The tubes and jackets are perforated sheets of suitable material such as galvanized steel with the perforations collectively having a flow capacity sufficient to pass the oil through the shells without significant flow resistance. The annular space between the shells is occupied by a pleated paper filter medium 90. The flow through these filters is outside to inside. The medium is paper of 20 mils nominal thickness having a Frazier Air Flow of 65 CFM/SF at a pressure differential of ½ inch of water. This paper is treated with a phenolic/silicone resin which is cured after the paper has been pleated to its final shape. The resin constitutes about 25% by weight of the final product. The outer jacket is a 100 mesh Teflon coated stainless steel screen material. Teflon is a DuPont trademark for polytetrafluoroethylene. The Teflon coating resists movement of water through the screen since it prevents surface wetting, forcing the water to remain in droplet form and fall out of the oil to the bottom of the vessel for subsequent discharge.

Each end of the separator element is provided with an end plate of the same design as that used in the coalescer elements. Accordingly, the construction appearing in FIG. 10 can be considered to illustrate this construction.

While the elements of both the coalescer columns and the separator columns have been described as joined by collars of the type illustrated in FIG. 5, a very satisfactory alternative is shown in FIG. 6. In this arrangement, the gaskets 44 are placed in abutment and a tube 92 of suitable material, such as aluminum, is seated in the openings of the abutting elements and both ends are swaged by a suitable tool to form enlarged heads 93 which flare radially outwardly over the inner ends of the inner flanges to push the elements together with enough force to assure formation of a liquid tight seal by the gaskets. Also, this force is sufficient to prevent rotation between or wobbling of the elements with respect to each other.

The separator elements can be each fabricated as single units. Particularly, is this feasible because they are shorter than the coalescer units. Also, if they are assembled from two units, as illustrated, they can be joined or ganged together using the same structure as illustrated in FIG. 6.

The polishing unit 96 is of the same construction as the preconditioning unit 10 except for the pleated filter element 90. This element which, like the filter element 56 of the coalescers, contains a multilayered filter medium section which is pleated (FIG. 9). The inner layer 98 is a paper of about 33–38 mils thickness treated with phenolic resin forming about 19% of the final weight of the filter element and having a Frazier Air Flow rating of 68 CFM/SF cubic feet per minute per square foot at ½ inch of water differential pressure. The intermediate layer 99 is filter paper of about 15 mils thickness with an air permeability of 4 cu. ft. per minute per square foot at ½ inch of water pressure differential.

The outer layer 120 is a filter paper of about 35 mils thickness having a nominal Frazier Air Flow rating of 14 cu. ft. per minute per square foot at one-half inch of water pressure differential. The pleated filter medium is surrounded by the perforated steel cylinder. The clean/dry oil discharged through the final or polish unit is then returned to the oil storage unit for reuse.

Fluid pressure is necessary to maintain flow through the equipment, and the pressure requirement increases rapidly as either the temperature falls below 100° F. or the water content increases. Further, this invention is designed to process lubricating oil having a far higher viscosity even at temperatures above 100° F. than the hydrocarbon materials, such as diesel fuel, previously processed by coalescence. Thus, to process the oil when the temperature falls below 100° F. or the water content increases or both, it is necessary that the unit have resistance to bursting pressure far in excess of any prior known coalescer. To avoid rupture of any of the elements, each coalescer unit 30 has an external bypass valve capable of diverting full flow around the elements. The pressure at which the bypass is set to operate is governed by the strength of the unit and the minimum flow it is considered necessary to maintain. In the construction which has been described, a bypass pressure of 40 psi has been selected which will accommodate 100 gals/minute flow. Another factor materially affecting operating pressure is the degree to which the various elements are clogged by dirt filtered from the oil. Because this latter can build up excessively high pressures, the burst strength of the units, particularly that of the tube 66, is designed to withstand a differential pressure of approximately 75 psi minimum. This is well above the automatic bypass valve activation pressure designed to prevent the pressure from ever reaching this limit.

The fact that coalescence has been used effectively for removal of water from hydrocarbon liquids, such as jet fuel, having a low viscosity, provides no guidelines for use with high viscosity hydrocarbon materials, such as a lubricating oil. A coalescing element capable of processing jet fuel at thirty gallons per minute can process lubricating oil with which this invention is concerned at only five gallons per minute at 100° F. As the volume is increased, the effectiveness drops rapidly to the point where, at a flow rate of ten gallons per minute, coalescence ceases entirely. Further, the invention provides an effective dewatering unit for lubricating oil even at a temperature such as 65° F. at which the nominal viscosity rating is over 300 ssu. At this low temperature and high viscosity, the invention effectively processes the lubricating oil at a rate of about twenty gallons per minute, twice that at which heretofore known coalescer units used on lubricating oils have failed entirely. The chart set out as FIG. 12A illustrates the fact that the invention is capable of maintaining a flow rate above 100 gallons per hour per square foot of coalescer surface until viscosity exceeds 150 ssu. Thus, the units flow rate capacity is far in excess of any coalescence equipment previously used.

The high volume capacity of the lubricating oil processing unit made possible by this invention also makes it possible to so design the unit that its weight and size are such that it can be mounted on a platform 130 which is capable of transport from one generating unit to another. In large generating facilities, this can have a substantial economic advantage. Therefore, it can be moved from one turbine or group of turbines to another turbine or group of turbines on a periodic service schedule. This can be done by the transport equipment, such as a forklift, which is normally available as standard equipment in a large steam turbine generating facility. The unit's efficiency and flow rate is so high that it can provide clean/dry turbine oil continuously to dramatically reduce turbine failures resulting from contaminated turbine oil.

Figure 12:
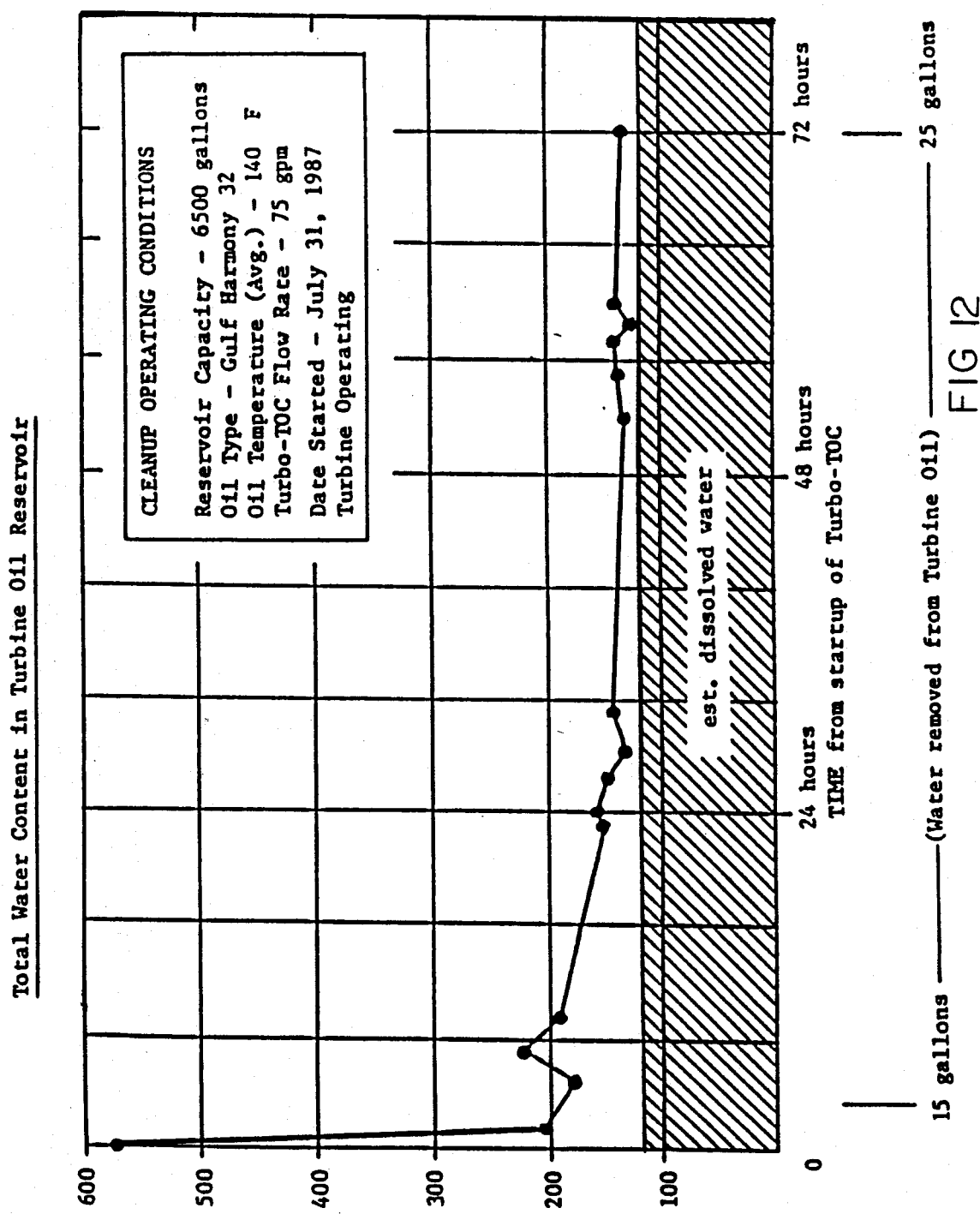
FIG. 12 is a graph of the initial test of equipment incorporating this invention.
Figure 12A:
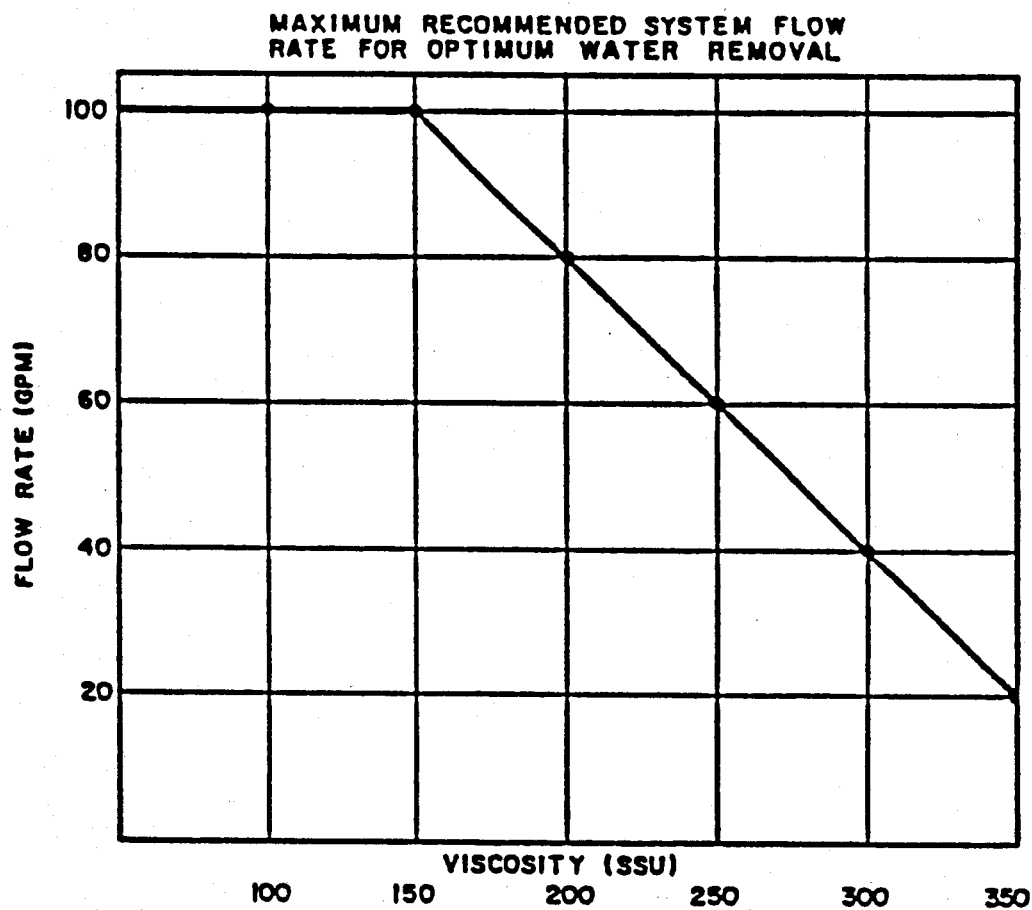
FIG. 12A is a graph of the flow capacity of the coalescers under different viscosity conditions.

FIG. 12 sets out graphically the results of the first partial test of the invention which was conducted under a reduced flow rate with a lubricating oil having a relatively low concentration of oil/water emulsion content. It is important to the evaluation of FIG. 12 that it reflects the water level in the entire oil reservoir, not just that of the oil being discharged from the equipment which has been described. It is also necessary to keep in mind that this invention does not, and was not intended to reduce the amount of dissolved water in the oil. This was pointed out in the background to this disclosure. The unit subsequently has been observed removing water from turbine oil at a rate of 21 gph.

Having described the process and equipment embodying this invention, it will be understood that various modifications of the invention can be made without departing from the principles of the invention and such modifications are to be considered as included in the hereinafter appended claims, unless these claims, by their language, expressly state otherwise.

We claim:

1. In the process of removing water by coalescence from lubricating oil having a viscosity at 65° F. of approximately 350 ssu which water has formed an emulsion with the oil and maintaining a flow rate of at least 100 gallons per hour per square foot of coalescer surface when the oil has a viscosity of 150 ssu or less, the steps which include passing the oil through a particulate filter element in a preconditioning unit, passing the oil containing free water and the oil/water emulsion into the internal central chamber of a coalescer; in the coalescer passing the oil through a first member of pleated filter medium surrounding said chamber to initiate breaking of the emulsion, supporting the member externally against outwardly acting pressure exerted by the oil and surrounding the pleats with spaced rings and anchoring the rings to the apices of said pleats to support the rings and members against outwardly acting radial thrust, passing the liquid discharged from the first member through plural layers of compressed glass fiber in mat form to further coalesce the separated water, passing the coalesced water droplets through a non-wettable screen into a non-compressed layer of glass fibers and then through a closely woven jacket of non-wettable fabric to form droplets of water of sufficient size that they will separate from the jacket and descend through the surrounding body of oil to collect at the bottom of the vessel in which the coalescer is housed.

2. The process described in claim 1 wherein the oil entering the process has a viscosity up to 350 ssu and an emulsified water content of 5000 parts per million, and leaving the process has a maximum combined free and emulsifed water content of about 25 ppm.

3. The process described in claim 1 wherein the oil having an initial water content of at least 5000 ppm, after coalescence has an emulsified water content of less than 25 parts per million.

4. In the process of removing by coalescence from lubricating oil having a viscosity of about 200 ssu at 100° F. water which has formed an emulsion with the oil which water in emulsion constitutes at least 5000 ppm, the steps which include passing the oil containing the emulsion at a temperature in the range of 100°–160° F. radially outwardly through a tubular pleated filter having plural layers of decreasing resistance to flow in a radially outward direction, stabilizing the pleats of the filter by plural axially spaced radial bands of a tension absorbing member engaging with and interconnecting the radially outer crowns of the pleats, circumferentially supporting the pleated filter by a perforated steel cylinder capable of withstanding an internal to external pressure differential in excess of 75 psi, passing the oil discharged from the filter and its support through a coalescence zone of fiberglass which has been compacted to one-tenth its normal thickness thereby causing the water to coalesce, passing the coalesced water and the oil through two zones of non-wettable material whereby water droplets are caused to coalesce into masses which will maintain their individual integrity and descend by gravity through the body of oil which has passed through and surrounds the coalescer.

5. The process of removing water from an emulsion of lubricating oil and water as described in claim 4 wherein the pressure differential across the coalescer unit is from <1 to 12 pounds per square inch.

6. A coalescer element for removing water from the oil/water emulsion portion of lubricating oil having a viscosity of approximately 200 ssu at 100° F., said element being multilayered and having a central tube of pleated filter material, a plurality of circumferential axially spaced tension members interconnecting the radial crowns of the outer layer of the pleats of said filter material; a perforated steel tube having a burst strength in excess of 75 psi differential surrounding said tube of pleated filter material and tension members for supporting them against radially acting pressure; a plurality of layer of glass fibers in mat form surrounding said steel tube and a perforate screen surrounding said glass fibers and compressing the same to approximately one-tenth of their original mat thickness; a layer of uncompressed glass fibers in mat form surrounding said screen and a fabric outer jacket of non-wettable material surrounding said uncompressed glass fibers, means sealing each end of the element against movement of liquids from the interior to the exterior thereof other than through the multilayers of the element.

7. A coalescer element as described in claim 6 wherein said sealing means is bonded to the ends of each layer of said element to form a seal preventing liquid from by-passing any of the individual layers which comprise the element.

8. A coalescer element as described in claim 7 wherein said tension members are endless bands of polyamide synthetic resin bonded to the crown of each pleat of the outer layer of said filter paper.

9. A portable means for use with a steam powered turbine generator for removing by coalescence water from turbine lubricating oil having a viscosity of approximately 100 ssu at about 100° F. which water has formed an emulsion with the oil said means having a first filter unit for receiving the oil from the turbine, said filter unit having elements for removing particular matter from the oil, a coalescer unit having a plurality of tubular coalescer elements, conduit means for transporting the filtered oil from the first filter unit to the internal chambers of said coalescer elements, said elements each being multilayered and having a central tube of pleated filter material, a plurality of rings of circumferential axially spaced tension members interconnecting the radial crowns of the outer layer of the pleats of said filter material and holding said pleats against circumferential displacement; a perforate steel tube surrounding said tube of pleated filter material and tension members for supporting them against radially acting pressure; plurality of layers of glass fibers in mat form surrounding said steel tube and a perforate screen surrounding said glass fibers and compressing the same to approximately one-tenth of their original mat thickness; a layer of uncompressed glass fibers in mat form surrounding said screen and a fabric outer jacket of non-wettable material surrounding said uncompressed glass fibers, means sealing each end of the coalescer elements against movement of liquids except by passage through the layers thereof, a separator unit and second conduit means for transporting thereto the oil from the coalescer unit, said separator unit having a plurality of separator elements each having a stainless steel screen of 100 mesh forming an exterior jacket, said screen being coated with polytetrafluoroethylene to repel water droplets formed by coalescence from passing therethrough, means for returning the processed oil from the separator unit to the turbine, a portable rack for mounting said first filter unit, said coalescer unit and said separator unit whereby said portable means can be moved from one turbine to another.

10. A coalescer element capable of removing emulsified water from lubricating oil having a viscosity of about 350 ssu at 65° F. throughout the temperature range of said 65° F. to at least that of lubricating oil discharged from an operating steam turbine, which coalescer element has the capability of maintaining an oil flow rate therethrough of at least 100 gallons per hour per square foot of coalescer surface at least until the viscosity exceeds 150 ssu, said coalescer element comprising a central tube of pleated filter material surrounding a central oil inlet chamber for the coalescer, said central tube being comprised of plural layers of pleated filter material, a plurality of circumferential axially spaced tension members interconnecting the radial crowns of the outer layer of the pleats of said filter material; a perforated steel tube having a burst strength in excess of 75 psi of pressure differential surrounding said tube of pleated filter material and tension members for supporting them against radially acting pressure; a plurality of layers of glass fibers in mat form surrounding said steel tube and a perforate screen surrounding said glass fibers and compressing the same to approximately one-tenth of their original mat thickness; a layer of uncompressed glass fibers in mat form surrounding said screen and a fabric outer jacket of non-wettable material surrounding said uncompressed glass fibers, means sealing each end of the element against movement of liquids from the interior to the exterior thereof other than through the multilayers of the element.

11. A coalescer element as described in claim 10 wherein said tension members are bonded to the crowns of the pleats of said filter material and said sealing means is bonded to the ends of each layer of said coalescer element to form a seal preventing liquid from bypassing any of the individual layers which comprise said coalescer element.

12. A coalescer element as described in claim 11 wherein said tension members are endless bands of polyamide synthetic resin.

* * * * *

UNITED STATES PATENT AND TRADEMARK OFFICE
CERTIFICATE OF CORRECTION

PATENT NO. : 4,892,667

DATED : January 9, 1990

INVENTOR(S) : Matt Parker III et al.

It is certified that error appears in the above-identified patent and that said Letters Patent is hereby corrected as shown below:

Column 6, line 45:
 Delete "into".
Column 8, line 30:
 "layer 120" should be -- layer 130 --.
Column 9, line 25:
 "platform 130" should be -- platform 120 --.
Column 10, line 66:
 "layer" should be -- layers --.
Column 11, line 21:
 After "oil" insert -- , --.
Column 11, line 35:
 After "pressure;" insert -- a --.

Signed and Sealed this

Twenty-ninth Day of October, 1991

Attest:

HARRY F. MANBECK, JR.

*Attesting Officer*  *Commissioner of Patents and Trademarks*